US009755830B2

(12) United States Patent
Pizano et al.

(10) Patent No.: US 9,755,830 B2
(45) Date of Patent: *Sep. 5, 2017

(54) DYNAMIC SEED AND KEY GENERATION FROM BIOMETRIC INDICIA

(71) Applicant: Ceelox Patents, LLC, Overland Park, KS (US)

(72) Inventors: Erix Pizano, Tampa, FL (US); Joe Sass, Land O Lakes, FL (US)

(73) Assignee: Ceelox Patents, LLC, Overland Park, KS (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/880,686

(22) Filed: Oct. 12, 2015

(65) Prior Publication Data

US 2016/0119138 A1 Apr. 28, 2016

Related U.S. Application Data

(63) Continuation of application No. 14/290,306, filed on May 29, 2014, now Pat. No. 9,160,532, which is a
(Continued)

(51) Int. Cl.
*H04L 9/08* (2006.01)
*G06F 21/32* (2013.01)
(Continued)

(52) U.S. Cl.
CPC ............ *H04L 9/0869* (2013.01); *G06F 21/32* (2013.01); *H04L 9/0816* (2013.01);
(Continued)

(58) Field of Classification Search
CPC ... H04L 9/0866; H04L 9/0816; H04L 9/0869; H04L 9/3231; H04L 63/0861; G06F 21/32
See application file for complete search history.

(56) References Cited

U.S. PATENT DOCUMENTS 5,280,527 A * 1/1994 Gullman ............ G06K 19/0718
713/184
6,038,315 A * 3/2000 Strait .................... H04L 9/0662
382/115

(Continued)

*Primary Examiner* — Robert Leung
(74) *Attorney, Agent, or Firm* — Erise IP P.A.

(57) ABSTRACT

Generating a seed and/or a key from live biometric indicia, such that all the information necessary for generating the seed and/or the key is not stored, is provided. A method comprises receiving and enrolling a biometric template from a user; assigning an optimization value to the enrolled biometric template; encrypting an item of test data using the optimization value, such that the optimization value is an encryption seed; storing the encrypted item of test data on the storage medium; destroying the encryption seed after encrypting the item of test data; receiving a live biometric template; comparing the templates and determining an interval based on a probability that the templates are specific to the same user; iteratively testing values within the interval to identify the value in the interval for decrypting the encrypted item of test data; and generating the key using the seed.

20 Claims, 4 Drawing Sheets

Related U.S. Application Data continuation of application No. 13/028,715, filed on Feb. 16, 2011, now Pat. No. 8,745,405.

(60) Provisional application No. 61/305,435, filed on Feb. 17, 2010.

(51) Int. Cl.
*H04L 9/32* (2006.01)
*H04L 29/06* (2006.01)

(52) U.S. Cl.
CPC .......... *H04L 9/0866* (2013.01); *H04L 9/3231* (2013.01); *H04L 63/0861* (2013.01); *H04L 29/06809* (2013.01); *H04L 2209/24* (2013.01)

(56) References Cited

U.S. PATENT DOCUMENTS

| | | | | |
|---|---|---|---|---|
| 6,049,612 A * | 4/2000 | Fielder | | H04L 9/0869 380/44 |
| 6,185,316 B1 * | 2/2001 | Buffam | | G06F 21/32 382/100 |
| 6,363,485 B1 * | 3/2002 | Adams | | H04L 9/3231 713/186 |
| 6,687,675 B1 * | 2/2004 | Archambeau | | G09F 27/00 434/169 |
| 6,928,163 B1 * | 8/2005 | Matyas, Jr. | | H04L 9/302 380/28 |
| 7,272,245 B1 * | 9/2007 | Layton | | G06K 9/0061 340/5.2 |
| 8,239,685 B2 * | 8/2012 | Lee | | G06F 21/32 713/171 |
| 8,312,291 B2 * | 11/2012 | Golic | | G06K 9/00288 382/115 |
| 8,417,960 B2 * | 4/2013 | Takahashi | | H04L 9/0866 340/5.82 |
| 2003/0091218 A1 * | 5/2003 | Hamid | | G06K 9/00067 382/124 |
| 2003/0219121 A1 * | 11/2003 | van Someren | | G07C 9/00158 380/44 |
| 2004/0034783 A1 * | 2/2004 | Fedronic | | G07C 9/00158 713/186 |
| 2005/0210269 A1 * | 9/2005 | Tiberg | | H04L 9/3231 713/186 |
| 2006/0075255 A1 * | 4/2006 | Duffy | | G06K 9/00885 713/186 |
| 2006/0083372 A1 * | 4/2006 | Chang | | H04L 9/0866 380/44 |
| 2006/0123241 A1 * | 6/2006 | Martinian | | H04L 9/3231 713/186 |
| 2007/0050303 A1 * | 3/2007 | Schroeder | | G06F 21/32 705/67 |
| 2007/0174633 A1 * | 7/2007 | Draper | | G06K 9/00073 713/186 |
| 2007/0226512 A1 * | 9/2007 | Kevenaar | | G06F 21/32 713/186 |
| 2007/0245154 A1 * | 10/2007 | Akkermans | | G06K 9/00885 713/186 |
| 2009/0164979 A1 * | 6/2009 | Fischer | | G06F 11/3476 717/128 |
| 2010/0017618 A1 * | 1/2010 | Golic | | G06K 9/00288 713/186 |
| 2010/0066493 A1 * | 3/2010 | Rachlin | | G06F 21/32 340/5.82 |
| 2010/0316260 A1 * | 12/2010 | Nenni, Jr. | | G06F 21/32 382/115 |
| 2011/0022847 A1 * | 1/2011 | Duffy | | G06K 9/00087 713/179 |
| 2011/0047377 A1 * | 2/2011 | Allen | | H04L 9/0866 713/168 |

* cited by examiner

DYNAMIC SEED AND KEY GENERATION FROM BIOMETRIC INDICIA

RELATED APPLICATION

The present application is a continuation patent application and claims priority benefit, with regard to all common subject matter, of earlier-filed U.S. patent application Ser. No. 14/290,306, filed May 29, 2014, and entitled "DYNAMIC SEED AND KEY GENERATION FROM BIOMETRIC INDICIA," which is now U.S. Pat. No. 9,160,532, issued Oct. 13, 2015 ("the '532 Patent"). The '532 Patent is a continuation patent application and claims priority benefit, with regard to all common subject matter, of earlier-filed U.S. patent application Ser. No. 13/028,715, filed Feb. 16, 2011, entitled "DYNAMIC SEED AND KEY GENERATION FROM BIOMETRIC INDICIA," which is now U.S. Pat. No. 8,745,405, issued Jun. 3, 2014 ("the '405 Patent"). The '405 Patent claims priority benefit, with regard to all common subject matter, of U.S. Provisional Patent Application No. 61/305,435, entitled "DYNAMIC SEED AND KEY GENERATION FROM BIOMETRIC INDICIA," filed Feb. 17, 2010. The above-referenced patents and provisional patent application are hereby incorporated by reference into the present application in their entirety.

BACKGROUND OF THE INVENTION

Field of the Invention

The present invention relates to seed and key generation systems for encryption methods. More particularly, the invention relates to a seed and a key generation system for non-deterministic biometric indicia. The system does not store all necessary information for regenerating an encryption seed or generating an encryption key. Instead, the system destroys the seed and key and requires a live biometric sample to recreate the seed/key.

Description of the Related Art

Limiting access to a storage medium or device or a secure repository stored on a device is often desirable. Access to the storage device may be limited to one or more authenticated users. To authenticate a user, the user must initially enroll a biometric identifier specific to the user. This biometric identifier serves as an authentication password to verify the user's identity. When future access to the storage device is desired, the user provides the same biometric identifier, referred to as a live biometric identifier. The enrolled and live biometric identifiers are compared, and if the authentication system determines that the biometric identifiers likely belong to the same user, the system unlocks or otherwise retrieves a key for accessing the storage device.

In many authentication systems, the key is encrypted prior to being stored on the storage device or otherwise made accessible by the storage device. Encryption of the key does provide some security, as a hacker (who does not have access to the live biometric identifier for the specific user) must decrypt the key prior to accessing the device. However, decryption of the key is often elementary to skilled hackers.

Another layer of security is often added to the storage device by requiring that the key be regenerated each time access to the device is requested. However, to regenerate the key, a seed must be stored (either in encrypted or even hashed form or unencrypted or unhashed form). Similar to the encrypted key, a stored encrypted seed is still vulnerable to hackers.

In view of the concerns with storing the seed/key on the storage device or otherwise making accessible by the device, authentication systems have been developed that do not store the seed and/or key on the storage device itself. Instead, the seed and/or key is communicated or otherwise transferred to an authentication server, at which it is stored. When the user desires to access the storage device, the authentication system verifies the user's identity and transfers the seed and/or key to the device for accessing of the device. This authentication method is still vulnerable to security risks, as transferring the seed and/or key increases the potential for hacking and compromises the overall security of the encryption system.

The above security disadvantages are germane to many common encryption methods, including symmetric encryption and asymmetric encryption, and authentication systems, such as a one-time password authentication system. Specifically, supply of a password in a HOTP algorithm is particularly subject to security risks.

As is known, the HOTP algorithm is an HMAC based one-time password authentication system. OTP algorithms provide a single-use (i.e., one-time) password based on a known time, a known last password entered, and a key (or a seed for generating a key) stored by or at an authentication server. A client, which could be a storage device or software on the user side, and the authentication server run the HOTP algorithm in parallel. The authentication server running the HOTP algorithm typically uses an input key, a timer (or counter), and a known previous password to determine the next password in the algorithm's sequence. At the time of the user requesting access to the storage device or software, the storage device or software on the user will output a password. The outputted password at the user side is compared to the password, at the authentication side, determined by the HOTP algorithm to be the next password in the sequence. The comparison is performed by the authentication server. If the passwords match, the user is granted access to the storage device. The outputted password at the user side is different each time and only viable for a short time, thus making it a one-time password.

Accordingly, there is a need for an encryption system that does not store or otherwise provide access to all of the information necessary for obtaining access to a storage device. More particularly, there is a need for an encryption system that requires a live biometric identifier be provided at the time of access to the device for purposes of generating the seed and/or key—as opposed to merely authenticating an identity of the user.

SUMMARY OF THE INVENTION

Embodiments of the present invention solve the above-mentioned problems and provide a distinct advance in the art of seed and key generation systems. More particularly, embodiments of the invention provide a system, a computer program, and methods for seed and key generation from a non-deterministic live biometric identifier. The system of the present invention performs the methods implemented via the computer program. The system broadly comprises a storage device for interfacing with a computer; and a computer-readable storage medium integrated in or accessible by the storage device, the computer-readable medium having a plurality of modules comprising a plurality of code segments stored thereon, including an initialization module comprising an enrollment module for enrolling a biometric template and a seed generation module for initially generating a seed, a live capture module for capturing a live biometric template upon a user desiring to access the storage device, a seed regeneration module for regenerating the seed upon the user desiring to access the storage device, and a key generation module for generating a key from the seed.

During an initialization stage for the storage device, the enrollment module first receives information indicative of at least one biometric template specific to a user for storing on, or otherwise making accessible by, the storage device. The biometric template is then an enrolled biometric template that is used for comparison to any future, live capture biometric templates. The present invention assigns an optimization value to the enrolled biometric template. This optimization value is indicative of at least one representative feature of the enrolled biometric template.

After creating the enrolled biometric template and obtaining an optimization value for the template (or, more specifically, for biometric indicia associated with the biometric template), the seed is initially generated as part of the initialization stage. An item of test data is encrypted using the optimization value associated with the enrolled biometric template. Using the optimization value as an encryption value thus makes the optimization value the seed or otherwise directly associates the optimization value with the seed. The seed (i.e., the optimization value) is then destroyed, leaving only the encrypted item of test data, the unencrypted item of test data, and the enrolled biometric template stored on the storage device or otherwise made accessible by the device. The initialization stage is then complete, and the user may access the storage device at a future time by providing a live biometric template.

When the user desires to access the storage device subsequent to the initialization stage, the live biometric template is required for generating the seed previously destroyed during the initialization stage. In particular, the seed is regenerated by first comparing the enrolled biometric template with the live biometric template and determining an interval having a range based on a probability that the enrolled and live templates are specific to the same user. The interval has a plurality of values, and one of the values is indicative of or is the same as the destroyed encryption seed associated with the optimization value for the enrolled biometric template.

The present invention then iteratively tests the values within the interval by using each value to decrypt the stored, encrypted item of test data. If the encrypted item of test data can be decrypted with the tested value, then the tested value is the seed associated with the optimization value and used to encrypt the item of test data, such that the seed is regenerated.

If the seed is used to generate a key, which is then used to access the storage device, embodiments of the present invention generate the key using reflective code. In particular, the present invention employs a first code segment that at runtime observes and modifies a structure and a behavior of itself to generate a second code segment. The second code segment then uses the seed to generate the key. The key is operable to encrypt or decrypt one or more files stored on the storage device or to provide access to the storage device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
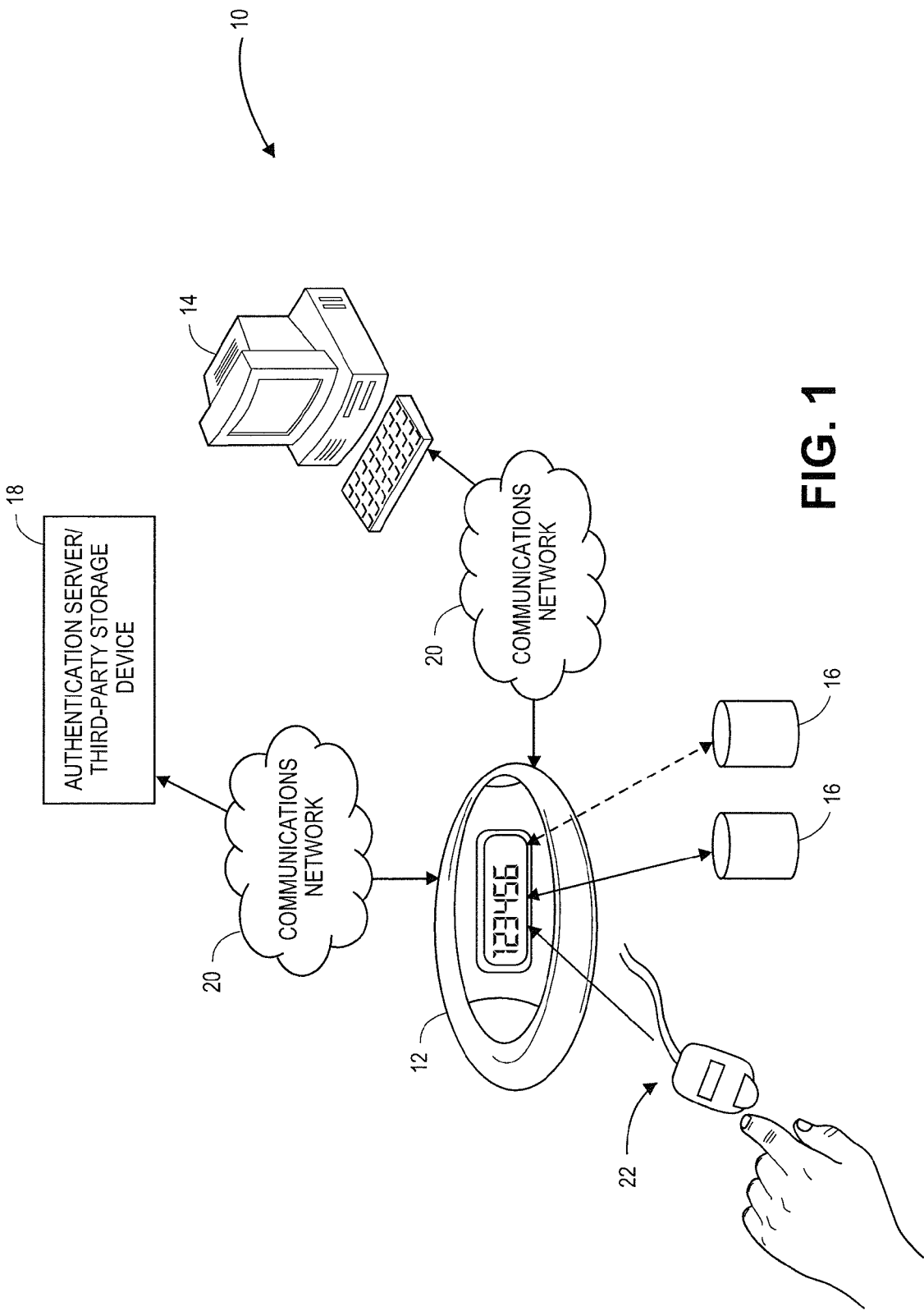
FIG. 1 is a schematic block diagram of a seed and key generation system constructed in accordance with various embodiments of the current invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A dynamic seed and key generation system 10 constructed in accordance with various embodiments of the present invention is shown in FIG. 1. The system 10 employs a storage device 12, such as a flash drive or mobile wireless device, for interfacing with a computing device 14 (also referred to herein as a "computer"). The storage device 12 includes an integrated computer-readable storage medium 16 or is otherwise operable to access a computer-readable storage medium 16. The storage medium 16 has a plurality of modules comprising a plurality of code segments stored on the computer-readable medium for implementing a computer program and a method of embodiments of the present invention. For ease of reference, the various components or steps of the computer program and method are referred to herein as modules. It should be appreciated, however, that particular sub-components or sub-steps within a module could be performed by a different module, or two or more modules could be combined into a single module. The categorization of the various components and steps is for ease of reference only.

Some or all of the seed and key generation modules described herein can be used for various access protocols and encryption/decryption protocols. For example, the seed and key generation system 10 can be used for allowing a user access to a secure repository stored on the storage device 12. The secure repository may be a database, a hard drive, a file, a folder, or any digital location to which access is limited based on the identity of the user. Alternatively, the system 10 can be used for encrypting/decrypting files or folders stored on the storage device 12. The system 10 can be used with both symmetric and asymmetric encryption methods and with various authentication systems, including a one-time password (OTP) algorithm, such as a HOTP algorithm.

Figure 2:
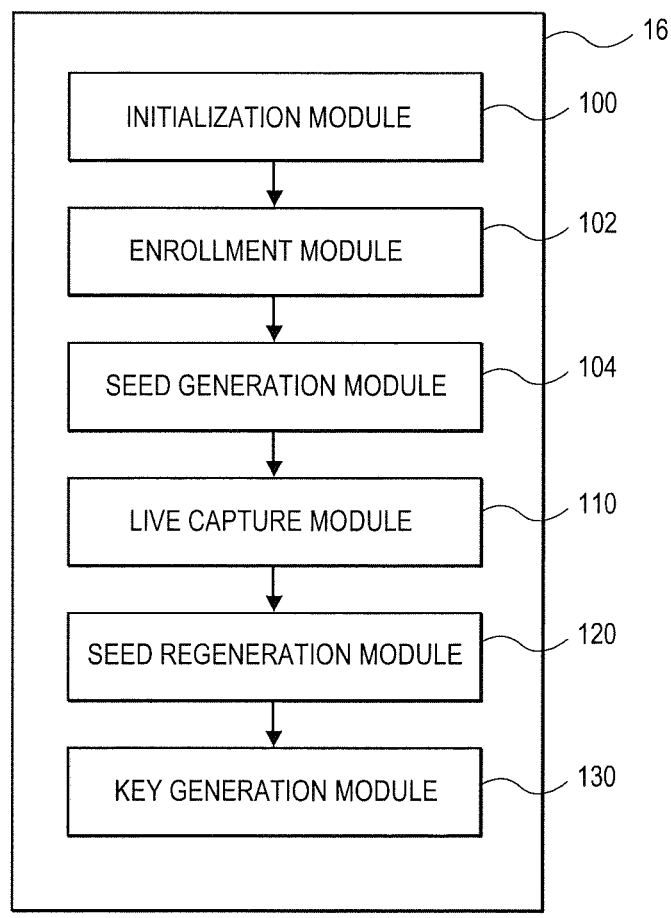
FIG. 2 is a block diagram of various modules comprising a plurality of code segments stored on a computer-readable medium of the present invention.

Referring to FIGS. 1 and 2, the seed and key generation system 10 broadly comprises the storage device 12; an initialization module 100 for initializing the storage device 12 for accessibility to the secure repository or for encryption/decryption purposes in the future, the initialization module 100 including an enrollment sub-module 102 for enrolling a biometric template, for determining an optimization parameter associated with the enrolled biometric template, and for storing the enrolled biometric template on, or otherwise making accessible to, the storage device, and a seed generation sub-module 104 for generating a seed using the optimization parameter associated with the enrolled biometric template, encrypting an item of test data with the seed, and subsequently destroying the seed; a live capture module 110 for capturing a live biometric template for use in regenerating the seed; a seed regeneration module 120 for regenerating the destroyed seed based on statistical matching of the enrolled and live biometric templates; and a key generation module 130 for generating a key from the regenerated seed.

The dynamic seed and key generation system 10 may be implemented in hardware, software, firmware, or a combination thereof. In various embodiments, the components of the seed and key generation system 10 may be implemented as software programs or processor-executable code segments that may be stored on the computer-readable storage medium 16. In the context of this application, a "computer-readable medium" or a "computer-readable storage medium" can be any device that can contain or store the computer program for use by or in connection with the instruction execution system, apparatus, or device. The computer-readable medium can be, for example, but not limited to, an electronic, magnetic, optical, electro-magnetic, biochemical, or semi-conductor system, apparatus, or device. More specific, although not inclusive, examples of the computer-readable medium include the following: a portable computer diskette, a hard drive, a random access memory (RAM), a read-only memory (ROM), an erasable, programmable, read-only memory (EPROM or Flash memory), a portable compact disk read-only memory (CDROM), a digital video disc (DVD), a Blu-Ray™ disc, and the like. In certain embodiments of the present invention, the computer-readable medium 16 is integrated with, or accessible by, the storage device 12, which may be portable, such as a flash drive or thumb drive, and that is interfaced with the computing device 14. In other embodiments, the computer-readable medium 16 may be integrated with or accessible by the computing device 14.

An exemplary computing device 14 generally comprises any device that is capable of running an operating system and executing software applications, such as a workstation, a desktop computer, a laptop computer, a notebook computer, a palmtop computer, a tablet computer, such as an IPAD®, a mobile wireless communications device, a point of sale terminal, a credit card scanner, and the like. The computing device includes data processing circuitry coupled with memory components to execute computer code or software, such as processors, microprocessors, multi-core microprocessors, microcontrollers, combinations thereof, and the like.

The various modules and sub-modules described herein represent steps implemented by the method. The steps of the method are preferably implemented via the computer program or software comprising a plurality of code segments stored on the computer-readable medium 15 and executable by the computing device 14. For ease of reference herein, reference to the modules should be understood to encompass both the method and the computer program of the present invention.

Figure 3:
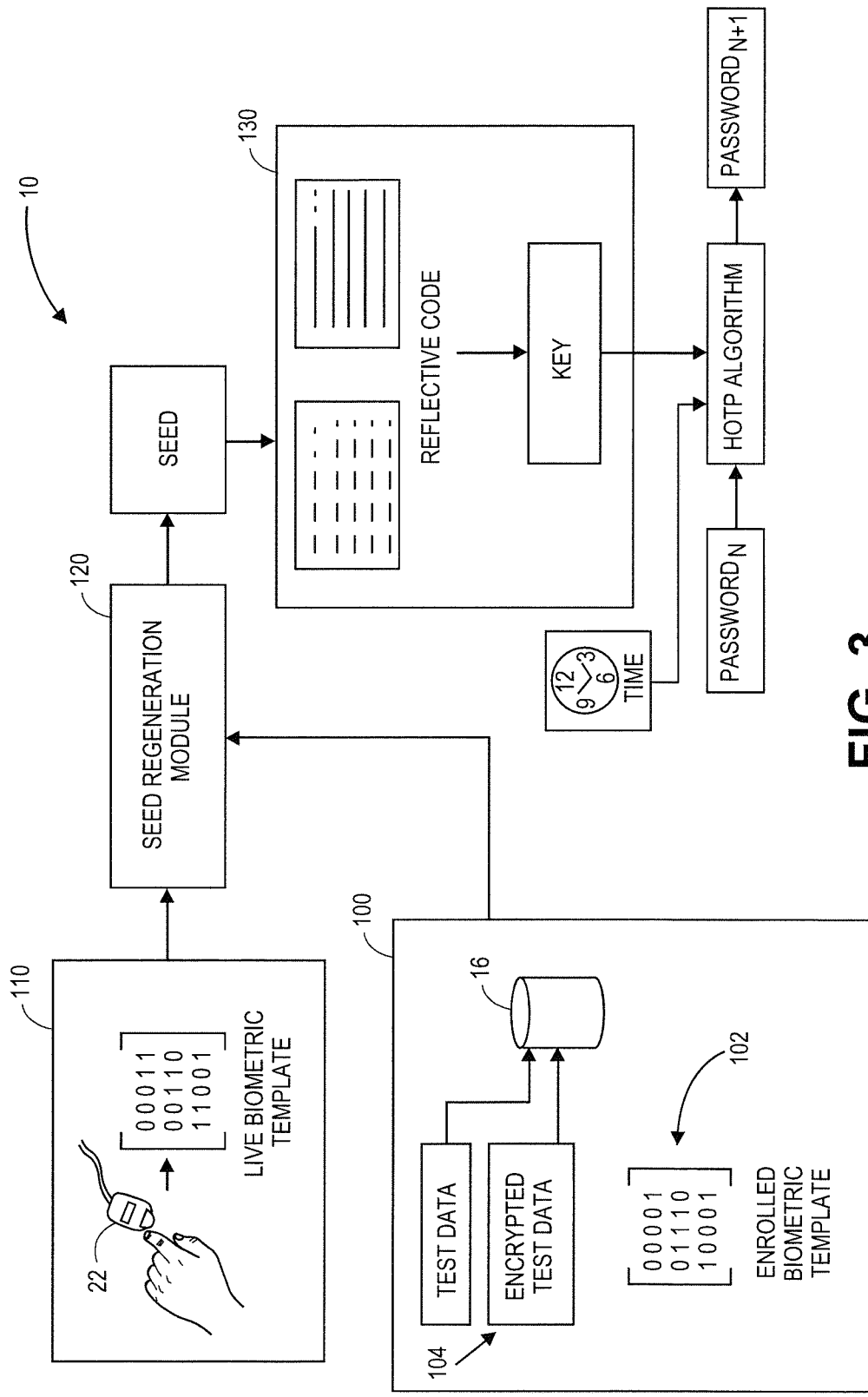
FIG. 3 is a block diagram of at least some steps of a method for seed and key generation.

Referring now to FIGS. 1-3, the system, computer program, and method of the present invention will be described in detail, with initial reference to the initialization module 100 for setting up the storage device 12. The initialization of the storage device includes enrolling an enrolled biometric template via the enrollment module and creating or generating a seed via the seed generation module. Initialization is required so that the storage device is associated with a specific user, such that only the specific user can access a secure repository on the storage device, encrypt/decrypt files or folders saved on the storage device, or obtain a password via an OTP algorithm, such as a HOTP algorithm. In most circumstances, the initialization of the storage device will only be required once. However, should the user wish to erase the storage device, enroll a different biometric identifier, or enroll a different or additional user, the initialization will need to be performed again.

As noted above, the initialization module 100 comprises an enrollment sub-module 102 (or simply, an enrollment module) and a seed generation sub-module 104 (or simply, a seed generation module). The enrollment module 102 is operable to enroll a biometric template, determine the optimization parameter associated with the enrolled biometric template, and store the enrolled biometric template on, or otherwise make accessible by, the storage device. The seed and key generation system employs biometric indicia to generate the seed/key, allow access to files or information, encrypt/decrypt files or information, or provide one-time passwords when used with a OTP algorithm (collectively or individually broadly referred to herein as "allowing access to the storage device"). The enrolled biometric template is permanently stored on or otherwise made accessible to the storage device, as illustrated in FIGS. 1 and 3. In contrast, the live biometric template, which is discussed below, is provided for seed and key generation at the time the user wishes to access the storage device, but the live biometric template is not permanently stored on the storage device and is deleted once access is granted.

It is to be appreciated that some or all of the modules, the enrolled biometric template, and other information discussed herein as stored on the storage device or otherwise made accessible by the storage device may be stored at a third-party storage device 18, such as an authentication server 18, the computing device 14, or the like. Moreover, the storage device 12 may communicate with the computing device 14 and/or the third-party storage device 18 via known communication networks 20 and techniques, including device-to-device networking, cloud networking, an Ethernet network, an 802.11 wireless network, a blue tooth network, a computer bus, or any other device, apparatus, system, or combination thereof capable of enabling communication, individually or collectively, among the storage device, the computing device, and the third-party storage device.

Referring to FIG. 1, the biometric indicia for a particular biometric identifier, such as a fingerprint of a finger, is obtained through a biometric sensor 22, which may be coupled with, integrated in, or accessible by the storage device 12 and/or the computing device 14. For example, the storage device could be a mobile wireless communications device, and the biometric sensor could be integrated with the communications device. Alternatively, the storage device could be a flash or thumb drive including an integrated biometric sensor. An even further alternative could be a biometric sensor coupled to the storage device and/or computing device. The biometric sensor could be a fingerprint scanner or other suitable biometric sensor for receiving the biometric identifier, identifying and capturing unique biometric indicia associated with the biometric identifier, and creating the biometric template. It should be understood that the biometric sensor could be any device to extract biometric indicia sufficient for creating a biometric template or that otherwise creates unique indicia. For example, a lightwave spectrum sensor captures biometric characteristics not visible to the human eye.

It is to be understood that the present invention is for use with all types of biometric indicia, including fingerprints, palm prints, the orientation and arrangement of features on a face, iris scans, and DNA. However, for ease of reference herein, the biometric indicia will be described with respect to a fingerprint.

Figure 4:
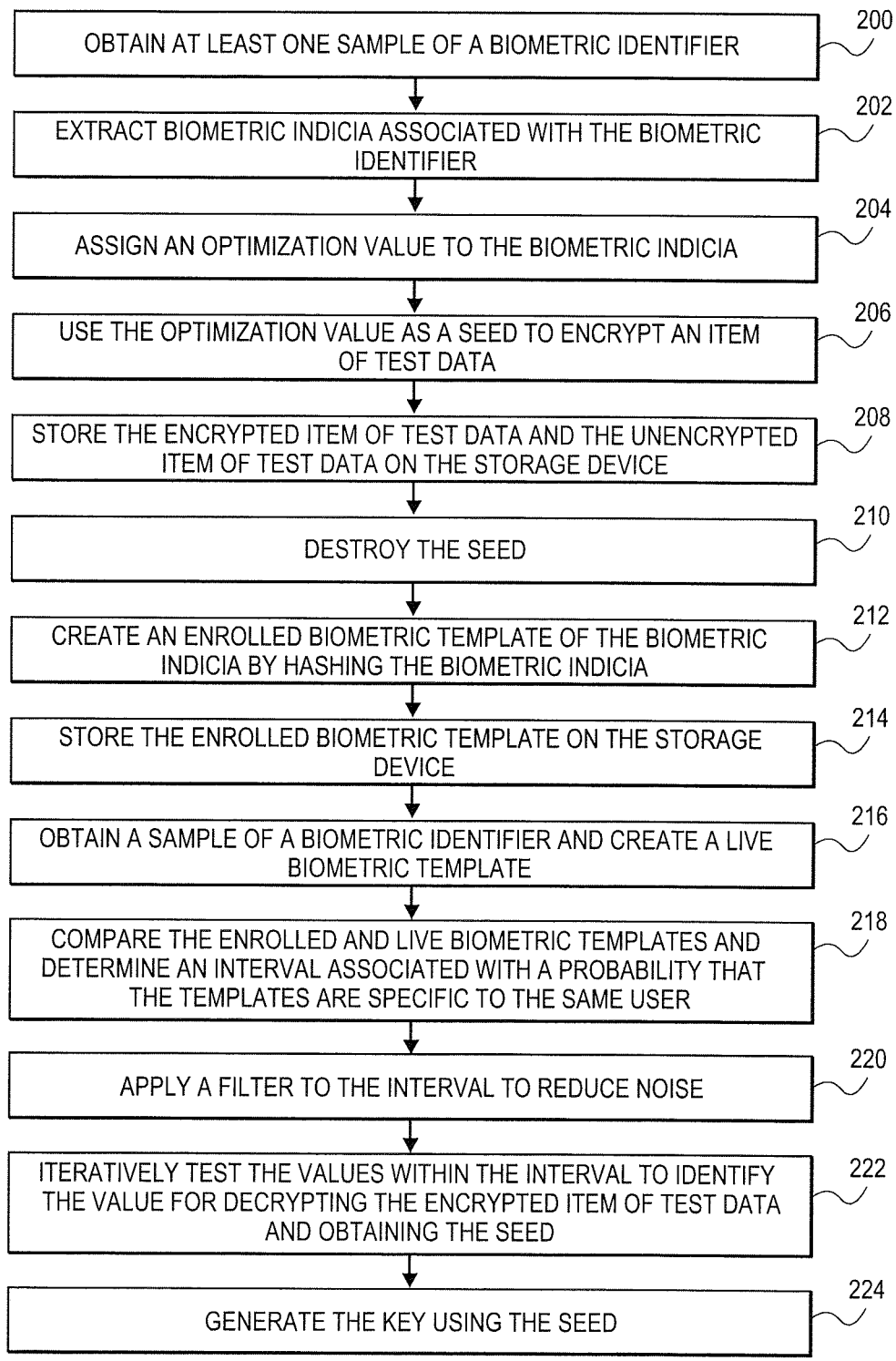
FIG. 4 is a flow chart of at least some steps of a method for seed and key generation.

To enroll a biometric identifier specific to the user, a user of the invention initially provides at least one and often several samples of the same biometric identifier (i.e., the same finger for obtaining a fingerprint scan), as referenced at Step 200 of FIG. 4. Biometric indicia specific to the biometric identifier is then extracted via known biometric techniques, as referenced at Step 202. For certain types of biometric identifiers, such as fingerprints, there is a statistically extremely low probability of extracting the same collective biometric indicia for the biometric identifier each time a scan or sample of the identifier is taken. The biometric indicia associated with the biometric identifier is therefore non-deterministic, in that the collective biometric indicia cannot be accurately identified each time the biometric identifier is scanned or sampled.

It is common to employ a mathematical algorithm to identify representative features of the biometric indicia specific to the biometric identifier. An exemplary, although non-limiting, algorithm for fingerprints is a vector-based matching algorithm. The goal of any algorithm for digitally representing a biometric identifier as a biometric template is to identify the representative features that will most likely be extracted from any future scan or sample taken of the particular biometric identifier. Thus, in the case of fingerprints, a representative feature may be a pattern of ridges or valleys in the fingerprint that will likely be identified in any future fingerprint scans. For purposes of the enrollment module of the present invention, one or more scans or samples of the biometric identifier may be taken for obtaining the one or more representative features.

From these representative features, the present invention identifies an optimization value specific to the enrolled biometric indicia, as referenced at Step 204. The optimization value is a value, parameter, or other feature that is statistically highly likely to be the same as or close to a value, parameter, or other feature identified in any future live scan or sample of the biometric identifier. Thus, the optimization value is unique to the particular biometric identifier. Notably, however, the optimization value is not necessarily the value that is most representative of the biometric identifier. Instead, the optimization value can be a value that is statistically close to a representative value of the biometric identifier.

The optimization value may be determined through various known optimization techniques, including, but not limited to, averaging the biometric indicia of each sample or scan of the biometric identifier and creating a correlation and a projection and determining expected asymptotes.

After determining the optimization value, the seed is initially generated. The seed can be a key to allow access to the storage device 12, or the seed can be used to create, derive, or generate a key that in turn allows access to the storage device. In the present invention, the seed is used for both purposes. In particular, as part of the seed generation module 104, the seed is first used to encrypt an item of test data, as referenced at Step 206. The item of test data is preferably a relatively small-sized piece of data, such as less than approximately 1 MB, that is used as a standard or measure by which to determine if a seed regenerated in the future is the same as the seed initially created by the seed generation module 104. The unencrypted item of test data (i.e., the item of test data in its initial form before encryption with the seed) and the encrypted item of test data are stored on or otherwise made accessible by the storage device, as referenced at Step 208. The seed is then subsequently destroyed, as references at Step 210.

In embodiments of the present invention, the seed is the optimization value associated with the enrolled biometric indicia or is otherwise information indicative of the optimization value. Thus, the seed is directly associated with the enrolled biometric indicia, and, in particular, the biometric identifier specific to the user. Encryption of the item of test data is performed using, at least in part, the optimization value or information associated with or indicative of the optimization value.

Commensurate with or immediately subsequent to creating the seed, the enrolled biometric template is created, as referenced at Step 212. To obtain or create the enrolled biometric template, the enrolled biometric indicia is hashed or otherwise transformed with the aid of an injective function or via other known techniques. The enrolled biometric template is the digital representation of the biometric identifier (a present size of a common biometric template is approximately 1 MB). Because the biometric indicia is hashed, the optimization value cannot be determined based on knowing the enrolled biometric template alone, as the result of an injective function such as a hashing algorithm is to prevent reverse engineering of the enrolled biometric template. Although the optimization value is determined or assigned prior to creation of the enrolled biometric template (i.e., prior to hashing the biometric indicia to obtain the biometric template), reference herein to the optimization value being associated with the enrolled biometric template shall be understood to encompass the optimization value being associated with biometric indicia for the enrolled biometric identifier.

Upon determining an optimization value for the enrolled biometric template and creating the enrolled biometric template, the present invention stores the enrolled biometric template on the storage device or in a location accessible by the storage device, as referenced at Step 214. In embodiments of the present invention, the enrolled biometric template may be further encrypted or hashed prior to storage.

Upon completion of the enrollment and seed generation modules, the three items of information relevant to future seed regeneration and key generation remain stored on the storage device or otherwise accessible to the device, namely the enrolled biometric template, the unencrypted item of test data, and the encrypted item of test data. In this state, all information or data necessary for obtaining access to the storage device is not stored on the device or accessible to the device. For example, in prior art applications where the encrypted key is stored on the device, all the information necessary for obtaining access to the storage device is stored on the device. In theory, the user cannot access the storage device without providing a live biometric scan that authenticates the user and allows decryption of the key. However, because the encrypted key is still stored on the device, the device remains vulnerable to hacking. The same issues remain even if a seed for generating the key, rather than the key itself, is stored on the device (in encrypted or unencrypted form). In contrast, in the present invention there is at least one item of information necessary for obtaining access to the storage device that is not stored on the device or otherwise accessible to the device, namely the optimization value that serves as the encryption seed. If there is an item of necessary access information not stored on the device, the device cannot be hacked.

A result of not storing on the storage device all information necessary for obtaining access to the device is that access to the device cannot be obtained—under any hacking or vulnerability scenarios—without a live biometric identifier being provided at the time of granting access. To accomplish this level of security, embodiments of the present invention receive a live biometric template via the live capture module 110 and perform a seed regeneration via the seed regeneration module 120.

Referring to FIG. 2 and Step 216 of FIG. 4, the live capture module 110 is performed subsequent to the initialization module 100 and prior to each time the user desires to access the storage device 12. When desiring to access the storage device, the user will provide the biometric identifier used for the enrollment module 102 described above. A scan or sample of the biometric identifier will be taken via the biometric sensor 22, the biometric indicia associated with the biometric identifier will be identified, and a biometric template will be created, similar to the enrollment method described above for the enrolled biometric template. The biometric template created each time the user provides the biometric identifier for access to the storage device (but subsequent to the initialization of the storage device) is herein referred to as a live biometric template. The live capture module 110 will then receive information indicative of the live biometric template. As detailed below, the live biometric template is then used to regenerate the seed.

In alternative embodiments of the present invention, the live capture module 110, including the user providing a live scan or sample, may only need to be performed upon interfacing the storage device with a particular computing device, upon a period of time expiring, upon opening or selecting the secure repository, upon request or initiation of a particular event, or at any other time or upon any other action specified by the user during the initialization of the storage device.

After creation of the live biometric template, the seed regeneration module 120 is performed. Referring to FIG. 2 and Step 218 of FIG. 4, the enrolled biometric template is compared with the live biometric template to determine a likelihood that the templates are indicative of the same biometric identifier (i.e., specific to the same user). The seed regeneration module 120 performs a matching algorithm by comparing the biometric indicia for each of the templates and determining a matching value or score that represents the probability that the templates "match" (i.e., the templates are specific to the same user). As discussed above, it is statistically very unlikely that the matching score will be a 100% probability for non-deterministic biometric identifiers, as the biometric indicia for the live biometric template will most likely be different than the indicia for the enrolled biometric template. However, in most circumstances where a suitable live biometric scan or sample of the live biometric identifier is obtained, the matching score will be sufficiently indicative of the biometric indicia of the enrolled biometric template for purposes of the present invention.

After the matching score is obtained, embodiments of the present invention determine a statistical interval having a range based on the matching score, namely a probability that the enrolled and live biometric templates are specific to the same user. A plurality of values lie within the interval. A size of the range of the interval from the lowest value to the highest value is dependent on the matching score. The higher the matching score (i.e., the more likely the enrolled and live biometric templates belong to the same user), the smaller the range of the interval. Similarly, the lower the matching score, the larger the range of the interval. Thus, the size of the range of the interval is inversely proportional to the magnitude of the matching score.

The values that lie within the interval are indicative of the representative features of the live biometric indicia specific to the live biometric identifier. Similar to as discussed above with respect to the enrolled biometric template, the algorithm for creating the live biometric template will identify prominent characteristics or representative features associated with the live biometric identifier. These prominent characteristics will then be represented by the live biometric indicia as values. At least one of these values will lie within the range of the interval in the event the enrolled and live biometric identifiers are the same.

If the enrolled and live biometric templates belong to the same biometric identifier, then the interval determined by the seed regeneration module will encompass the optimization value for the enrolled biometric template—even though the optimization value for the enrolled template is no longer known. This is because the optimization value for the enrolled template is indicative of a prominent characteristic or representative feature of the biometric identifier provided during the enrollment process. Moreover, the values that lie within the interval are indicative of one or more prominent characteristics or representative features of the biometric identifier provided for access to the storage device subsequent to the enrollment process. Although the likelihood of assigning the same value for the same prominent characteristic for both templates is very low, the likelihood of the biometric template algorithm identifying one or more values close to the optimization value and within a range suitable for performing the seed regeneration of the present invention is high. Thus, the seed regeneration module of the present invention guarantees that if the enrolled and live biometric templates belong to the same biometric identifier, then the optimization value associated with the enrolled biometric template will lie within the range of the determined interval (assuming that a suitable scan or sample of the live biometric identifier was obtained). Further, because the optimization value is the same as or associated with the destroyed seed, the seed regeneration module determines a statistical interval having a plurality of values, wherein one of the values is indicative of or is the same as the destroyed encryption seed associated with the optimization value for the enrolled biometric template.

For purposes of reducing the processing requirements and time for seed regeneration, embodiments of the present invention apply a filter to the interval to reduce any noise in the interval, as referenced at Step 220 of FIG. 4. After application of the filter to the interval, the filtered interval has fewer values remaining therein than prior to application of the filter. The filter of embodiments of the present invention discards vales known to not be the optimization value based on filtering techniques known in the art, such that subsequent to application of the filter, the value indicative of or the same as the destroyed encryption seed remains in the filtered interval. An exemplary filter is a checksum filter.

Subsequent to applying the filter to the interval, embodiments of the present invention regenerate or otherwise uncover the seed via an iterative testing process. In more detail and as referenced at Step 222, the seed regeneration module individually tests, according to a scheduled sequence, the values within the interval to determine if one of the particular values is the seed. To test a value, the value is used to decrypt the item of test data previously encrypted with the seed associated with the optimization value for the enrolled biometric template. If decryption is successful, then the seed regeneration module 120 knows that the tested value is the seed previously destroyed during the enrollment process. The tested value is then a regenerated seed. If decryption is unsuccessful, the seed regeneration module iteratively tests the next value in the scheduled sequence to determine if the next value decrypts the encrypted item of test data. In embodiments of the present invention, the decryption of the encrypted item of test data is evaluated against the stored item of test data (i.e., the item of test data that was not encrypted and was originally stored during the enrollment process) to confirm that the two items of test data are indeed the same item of data.

The iterative testing of the values within the range is preferably performed according to the scheduled sequence. The scheduled sequence may be in any preferred order, including forward sequential, reverse sequential, or based on an order dependent on a statistical likelihood that a particular value, or range of values, in the interval is the seed. Moreover, it should be appreciated that during the iterative testing step, should the decryption of the encrypted item of test data be successful, the iterative testing is ceased, such that no further value within the interval is tested.

Upon regenerating the seed, the regenerated seed could be used as a key to allow access to the storage device. However, embodiments of the present invention provide the key generation module 130 for generating the key using the seed, as referenced at Step 224, which provides an additional layer of security in obtaining access to the storage device. Although the key may be generated via known techniques and methods, embodiments of the present invention preferably employ reflective code to generate the key.

Reflective code is a system or method of coding wherein a code segment observes and modifies a structure and a behavior of the code segment at runtime, and based on the structure and behavior, generates a second code segment. In more detail, reflective code is computer source code that can access metadata about the environment, classes, methods, and data at runtime. In addition, reflective code can dynamically instantiate objects that are otherwise unknown at coding or compile-time, execute functions or methods, and destroy objects. For example, code written in Java may use classes and methods in java.lang.reflect package to provide reflections. Similarly, Ruby code may use methods from the Object class, such as const_get( ) and send( ), for reflection. Thus, reflective code algorithms may use several different algorithms based on characteristics of the seed. For example, in a reflective algorithm, a different algorithm may be selected at runtime based on a modulo of the seed, a sum of the digits of the seed, or various other characteristics of the seed. Other key generation algorithms may utilize fuzzy logic, Kohonen maps, neural networks, heuristic functions, or other techniques to generate the key.

Embodiments of the present invention employ a first code segment that is reflective code and thus observes and modifies its structure and behavior at runtime. The first code segment generates a second code segment based on the observations and modifications of its structure and behavior at runtime. The results of these observations and modifications of the first code segment at runtime thus generate as data or instructions, i.e., a second code segment. The second code segment is then used to generate the key for allowing access to the storage device. The second code segment uses the regenerated seed to generate the key.

Reflective code does not require obfuscation of the key generation algorithm because the key generation algorithm is not otherwise generated or known until runtime. Because the seed is necessary to know the key generation algorithm, and further because the seed and the second code segment for ultimately generating the key are never stored on the storage device, use of reflective code provides a secure key generation technique. Thus, use of reflective code to generate the key allows for the code necessary for generating the key not being stored on the storage device. Instead, the first code segment that generates the second code segment at runtime, based on the first code segment's structure and behavior, is the only code stored on or otherwise made accessible by the storage device. Moreover, in embodiments of the present invention, the key cannot be generated without the second code segment first receiving the seed.

Alternative embodiments of the present invention may include multiple layers of reflective code segments that iteratively generate an additional or next code segment in the runtime sequence. For example, the first code segment could generate the second code segment, which in turn could generate a third code segment that is used to generate the key, or the third code segment could generate a fourth code segment that is used to generate the key. Thus, it is to be appreciated that use of reflective code for generating the key embodies at least one code segment being a reflective code segment.

Once the key is generated, it is used to allow access to the storage device. Neither the seed nor the key must be saved on, or otherwise made accessible by, the storage device to obtain access. Instead, the user need only provide a live biometric identifier to begin the seed regeneration and key generation processes.

Embodiments of the present invention are well-suited for various authentication methods, including a HOTP authentication system. When using the HOTP authentication system, the key may be regenerated and provided to a HOTP access module 140, as illustrated in FIG. 3. In particular, the key is fed to the HOTP algorithm to provide the password for entry by the user. As is known with HOTP algorithms, the user must enter a one-time password to gain access to the storage device. The key is also stored at an authentication server. Based on the last password entered (Password$_N$) and the expired time since the last password was entered, the authentication server knows the one-time password (Password$_{N+1}$) that should be entered by the user. The seed is retrieved from the live biometric template and the key is generated, according to the above-described process. This key is then fed to the HOTP algorithm to obtain the one-time password to be provided by the user. The authentication server authenticates the one-time password provided by the user. Thus, use of the present invention provides the password for entry by the user without requiring storage of the seed and/or key on the storage device.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

Having thus described various embodiments of the invention, what is claimed as new and desired to be protected by Letters Patent includes the following:

1. A system for regenerating a destroyed seed comprising:
   at least one processor; and
   at least one non-transitory computer readable storage medium having a computer program stored thereon, said computer program including:
      an initialization module that when executed by the at least one processor performs the steps of:
         enroll a biometric template from a user to obtain an enrolled biometric template, and
         assign an optimization value to the enrolled biometric template, said optimization value indicative of at least one feature of the enrolled biometric template;
      a seed generation module that when executed by the at least one processor performs the steps of:
         encrypt an item of test data using the optimization value to obtain an encrypted seed, and
         destroy the optimization value and any associated unencrypted seed;
      a live capture module that when executed by the at least one processor performs the steps of:
         receive a live biometric template provided by the user, and
         compare the live biometric template with the enrolled biometric template; and
      a seed regeneration module that when executed by the at least one processor performs the steps of:
         determine a testing interval comprising a plurality of values; and
         test at least a portion of the plurality of values within the testing interval to determine a decrypting value for the encrypted seed,
         said testing further including using each tested value to attempt to decrypt the encrypted seed,
         wherein upon a tested value successfully decrypting the encrypted seed, the destroyed seed is regenerated.

2. The system of claim 1, wherein the testing interval is based upon a probability that the live biometric template and the enrolled biometric template are indicative of a specific user.

3. The system of claim 2, wherein the testing interval is further based upon the optimization value associated with the enrolled biometric template.

4. The system of claim 1, wherein the testing is performed iteratively.

5. The system of claim 4, wherein one of the plurality of values within the testing interval is indicative of or is the same as said destroyed seed.

6. The system of claim 5, wherein the computer program further includes an interval-filtering module for applying a filter to the plurality of values within the testing interval to obtain a filtered interval.

7. The system of claim 6, wherein the filter reduces noise within the testing interval.

8. The system of claim 7, wherein subsequent to applying the filter, the one of the plurality of values indicative of or the same as the destroyed seed remains in the filtered interval.

9. The system of claim 1, the computer program further including a Key generation module for generating a decryption key based on the regenerated seed.

10. The system of claim 9, the computer program further including a decryption module for using the decryption key to decrypt the contents of a storage device.

11. A method for regenerating a destroyed seed comprising:
   enrolling a biometric template from a user to obtain an enrolled biometric template;
   assigning an optimization value to the enrolled biometric template, said optimization value indicative of at least one feature of the enrolled biometric template;
   encrypting an item of test data using the optimization value to obtain an encrypted seed;
   destroying the optimization value and any associated unencrypted seed;
   receiving a live biometric template provided by the user;
   comparing the live biometric template with the enrolled biometric template;
   determining a testing interval comprising a plurality of values; and
   testing at least a portion of the plurality of values within the testing interval to determine a decrypting value for the encrypted seed,
      said testing further including using each tested value to attempt to decrypt the encrypted seed,
   wherein upon a tested value successfully decrypting the encrypted seed, the destroyed seed is regenerated.

12. The method of claim 11, wherein the testing interval is based upon a probability that the live biometric template and the enrolled biometric template are indicative of a specific user.

13. The method of claim 12, wherein the testing interval is further based upon the optimization value associated with the enrolled biometric template.

14. The method of claim 11, wherein the testing is performed iteratively.

15. The method of claim 14, wherein one of the plurality of values within the testing interval is indicative of or is the same as said destroyed seed.

16. The method of claim 15, further including the step of applying a filter to the plurality of values within the testing interval to obtain a filtered interval.

17. The method of claim 16, wherein the filter reduces noise within the testing interval.

18. The method of claim 17, wherein subsequent to applying the filter, the one of the plurality of values indicative of or the same as the destroyed seed remains in the filtered interval.

19. The method of claim 11, further including the step of generating a decryption key based on the regenerated seed.

20. The method of claim 19, further including the step of using the decryption key to decrypt the contents of a storage device.

\* \* \* \* \*